United States Patent Office 3,631,173
Patented Dec. 28, 1971

3,631,173
2 - AMINOTHIENO[3,2-e]BENZOTHIAZOLE AND CERTAIN 4,5-DIHYDRO DERIVATIVES THEREOF
William Alan Remers, Suffern, N.Y., and Martin Joseph Weiss, Oradell, N.J., assignors to American Cyanamid Company, Stamford, Conn.
No Drawing. Filed Jan. 6, 1970, Ser. No. 1,044
Int. Cl. C07d 99/06
U.S. Cl. 260—305                          10 Claims

ABSTRACT OF THE DISCLOSURE

This disclosure describes compounds of the class of 2 - substituted - 4,5 - dihydrothieno[3,2-e]benzothiazoles useful as analgesics, anti-inflammatory agents or central nervous system depressants.

BRIEF SUMMARY OF THE INVENTION

This invention relates to new organic compounds and, more particularly, is concerned with novel 2-substituted-4,5-dihydrothieno[3,2-e]benzothiazoles and with methods of preparing these compounds. The novel compounds of the present invention may be represented by the following general formula:

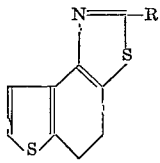

wnerein R is amino, hydrazino, mono(lower alkyl)amino, mono(lower alkenyl)amino or di(lower alkyl)amino. Suitable lower alkyl groups contemplated by the present invention are those having up to four carbon atoms such as, for example, methyl, ethyl, isopropyl, tert-butyl, etc. Suitable lower alkenyl groups are those having from three to six carbon atoms such as, for example, allyl, 2-butenyl, 3-butenyl, dimethallyl, and the like.

DETAILED DESCRIPTION OF THE INVENTION

The novel compounds of the present invention form non-toxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, citric, lactic, malic, succinic, tartaric, acetic, benzoic, gluconic, ascorbic, and related acids. For purposes of this invention, the free bases are equivalent to their non-toxic acid-addition salts.

The novel compounds of the present invention are generally obtainable as yellow crystalline materials having characteristic melting points and absorption spectra and which may be purified by recrystallization from common organic solvents such as lower alkanols. They are appreciably soluble in many organic solvents such as dimethylformamide, acetone, chloroform, and the like but are sparingly soluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel 2 - substituted - 4,5 - dihydrothieno[3,2-e] benzothiazoles of the present invention may be readily prepared from 5 - bromo - 4 - oxo - 4,5,6,7 - tetrahydrobenzothiophene upon treatment with thiourea, thiosemicarbazide, or an appropriately N-substituted thiourea as illustrated in the following reaction scheme:

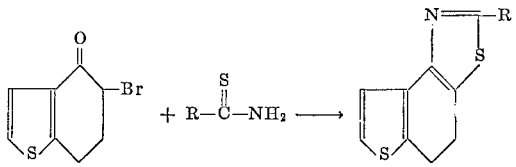

wherein R is as hereinabove defined. The reaction is best carried out in ethanol as solvent at the reflux temperature for a period of time of from about 3 hours to 15 hours or more. The product crystallizes from the reaction mixture after concentration to a small volume.

Certain of the novel 2 - substituted - 4,5 - dihydrothieno[3,2-e]benzothiazoles of the present invention [when R is other than amino] are active analgesics when measured by the "writhing syndrome" test for analgesic activity as described by Siegmund et al., Proc. Soc. Exptl. Biol. Med., vol. 95, p. 729 (1957), with modifications. This method is based upon the reduction of the number of writhes following the intraperitoneal injection of one mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less per pair. If desired, the results of this test procedure for 10 pairs of mice at each of several dose levels may be used to determine a median effective dose ($ED_{50}$), defined as the dose required to reduce the number of writhes from about 30 per pair to 18 or less per pair in 50% of the pairs. In a representative operation, and merely by way of illustration, the following compounds of the present invention are active analgesics when tested in this procedure at the indicated oral dose as set forth in Table I below:

TABLE I

| Compound: | Oral dose mg./kg. of body weight |
|---|---|
| 2-hydrazino-4,5-dihydrothieno[3,2-e]benzothiazole hydrobromide | 200 |
| 2-methylamino-4,5-dihydrothieno[3,2-e]benzothiazole | 200 |
| 2-dimethylamino-4,5-dihydrothieno[3,2-e]benzothiazole hydrochloride | 200 |
| 2-allylamino-4,5-dihydrothieno[3,2-e]benzothiazole | 200 |
| 2-aminothieno[3,2-e]benzothiazole | 200 |

Certain of the novel 2-substituted-4,5-dihydrothieno[3,2-e]benzothiazoles of the present invention l when R is mono(lower alkyl) amino or mono(lower alkenyl)amino] possess anti-inflammatory properties as determined by the carrageenin-induced rat paw edema test as follows. In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J. and prepared as a sterile 1% suspension in 0.09% aqueous sodium chloride. A volume of 0.05 milliliter is injected using a 26 gauge needle into the plantar tissue of the right hind paw of treated and untreated rats. Measurements of the volumes of the carrageenin inflamed right (challenged) pawl and left (unchallenged) pawl are determined 4 hours subsequent to the carrageenin challenege. The method of determining paw volumes is carried out essentially as described by C. A. Winter, et al., in Proc. Soc. Expt. Bio. Med. 111: 544–547 (1962) using mercury immersion. The differences in volume of the two paws of each rat is considered to be the volume of the carrageenin induced edema. The mean edema volume of eight control rats divided by the mean edema volume of two treated rats is calculated and designated the $C/T$ efficacy ratio. A compound is considered active in this test if the mean $C/T$ efficacy ratio of 2 consecutive tests is equal to or greater than 1.43. In a representative operation, and merely by way of illustration, the mean $C/T$ efficacy ratio (four rats) of 2-methylamino-4,5 dihydrothieno[3,1-e]benzothiazole and 2-allylamino-4,5-dihydrothieno[3,2-e]benzothiazole in the above-described test was 3.03 and 1.83, respectively.

2-amino-4,5-dihydrothieno[3,2-e]benzothiazole is a central nervous system depressant of low toxicity and was shown to possess CNS depressant activity as determined by animal experiments as follows. The compound was administered intraperitoneally in a 2% starch vehicle to groups of six mice at three or more graded dose levels. At 15-minute and 30-minute intervals after treatment, each animal was placed on the midpoint of a horizontal steel rod (1.55 cm. in diameter and about 6 dm. in length), positioned 45.7 cm. above the surface of the table, and forced to walk toward a platform at either end of the rod. The criterion of inability to perform this act was consistent slipping to the side or falling off the rod. The effective dose for reduced rod-walking ability ($RWD_{50}$) was calculated or approximated from the data, and the time of peak effect was estimated from the data. One-half of the $RWD_{50}$ dose was given intraperitoneally to each mouse in groups of five. At the time of peak effect, as determined above, each group of mice was put into the actophotometer for a period of five minutes and the motor activity counts were recorded and compared to controls. The compound was administered to additional groups of five mice at graded doses and tested similarly. The dose ($MDD_{50}$) that caused a 50% reduction in motor activity was estimated. 2-amino-4,5-dihydrothieno[3,2-e]benzothiazole was shown to induce ataxia ($RWD_{50}$) at a dose of 10 mg./kg. of body weight and to reduce locomotor activity ($MDD_{50}$) at a dose of 20 mg./kg. of body weight.

When mixed with suitable excipients or diluents, the compounds of this invention can be prepared as pills, capsules, tablets, powders, solutions, suspensions, and the like for unit dosage and to simplify administration.

The invention will be described in greater detail in conjunction with the following specific examples.

EXAMPLE 1

Preparation of 2-amino-4,5-dihydrothieno[3,2-e] benzothiazole hydrobromide

A solution of 6.93 g. of 5-bromo-4-oxo-4,5,6,7-tetrahydrobenzothiophene [J. Pharm. Sci. 54, 753 (1965)] and 2.28 g. of thiourea in 100 ml. of ethanol is heated at reflux temperature for 16 hours. It is then concentrated until the first crystals appear and then cooled. This procedure gives the product as pale yellow needles which melt at 235°–236° C. after three recrystalliaztions from ethanol.

EXAMPLE 2

Preparation of 2-hydrazino-4,5-dihydrothieno[3,2-e] benzothiazole hydrobromide

This compound is prepared by the procedure described in Example 1. From 4,19 g. of 5-bromo-4-oxo-4,5,6,7- tetrahydrobenzothiophene and 1.66 g. of thiosemicarbazide the product is obtained as yellow crystals, M.P. 182°–183.5° C. in 58% yield.

EXAMPLE 3

Preparation of 2-methylamino-4,5-dihydrothieno[3,2-e] benzothiazole

A mixture of 2.31 g. of 5-bromo-4-oxo-4,5,6,7-tetrahydrobenzothiophene, 1.35 g. of N-methylthiourea, 2 ml. of triethylamine and 100 ml. of ethanol is heated at reflux temperature for 3 hours and then concentrated to a small volume. The product (1.55 g.), which crystallizes from this concentrate, has M.P. 165°–167° C. after recrystallization from ethanol.

EXAMPLE 4

Preparation of 2-ethylamino-4,5-dihydrothieno[3,2-e] benzothiazole

By replacing the N-methylthiourea employed in Example 3 with an equimolecular quantity of N-ethylthiourea and following substantially the same procedure described in Example 3, there is obtained the 2-ethylamino-4,5-dihydrothieno[3,2-e]benzothiazole.

EXAMPLE 5

Preparation of 2-n-propylamino-4,5-dihydrothieno[3,2-e] benzothiazole

The procedure of Example 3 is repeated, substituting an equimolar amount of N-n-propylthiourea for the N-methylthiourea employed in that example. There is thus obtained the 2-n-propylamino-4,5-dihydrothieno[3,2-e]benzothiazole.

EXAMPLE 6

Preparation of 2-isobutylamino-4,5-dihydrothieno[3,2-e] benzothiazole

In place of the N-methylthiourea of Example 3, there is employed an equimolecular quantity of N-isobutylthiourea whereby the 2 - isobutylamino - 4,5 - dihydrothieno [3,2-e]benzothiazole is obtained in equally good yield.

EXAMPLE 7

Preparation of 2-allylamino-4,5-dihydrothieno[3,2-e] benzothiazole

This compound is prepared by the procedure described in Example 3. From 2.0 g. of 5-bromo-4-oxo-4,5,6,7-tetrahydrobenzothiophene and 1.08 g. of N-allylthiourea is obtained 1.45 g. of the desired product, which has M.P. 128°–130° C. after recrystallization from ethanol.

EXAMPLE 8

Preparation of 2-crotylamino-4,5-dihydrothieno[3,2-e] benzothiazole

Following the general procedure of Example 3, 5-bromo-4-oxo - 4,5,6,7 - tetrahydrobenzothiophene is treated with N-crotylthiourea to give the 2-crotylamino-4,5-dihydrothieno[3,2-e]benzothiazole.

EXAMPLE 9

Preparation of 2-dimethylallylamino-4,5-dihydrothieno [3,2-e]benzothiazole

Following the general procedure of Example 3, 5-bromo-4-oxo - 4,5,6,7 - tetrahydrobenzothiophene is treated with N-dimethallylthiourea to give the 2-dimethallylamino-4,5-dihydrothieno[3,2-e]benzothiazole.

EXAMPLE 10

Preparation of 2-dimethylamino-4,5-dihydrothieno[3,2-e] benzothiazole hydrochloride This compound is prepared by the procedure described in Example 3. From 2.31 g. of 5-bromo-4-oxo-4,5,6,7-tetrahydrobenzothiophene and 1.35 g. of 1,1-dimethylthiourea is obtained the desired product as 2.1 g. of an oil.

This oil, upon treatment with anhydrous hydrogen chloride in ether, is converted into its hydrochloride salt which has melting point 245°–250° C.

EXAMPLE 11

Preparation of 2-diethylamino-4,5-dihydrothieno[3,2-e] benzothiazole

By replacing the N,N-dimethylthiourea employed in Example 10 with an equimolecular quantity of N,N-diethylthiourea and following substantially the same procedure described in Example 10, there is obtained the 2-diethylamino-4,5-dihydrothieno[3,2-e]benzothiazole.

EXAMPLE 12

Preparation of 2-methylethylamino-4,5-dihydrothieno [3,2-e]benzothiazole

The procedure of Example 10 is repeated, substituting an equimolar amount of N - methyl - N - ethylthiourea for the N,N-dimethylthiourea employed in that example. There is thus obtained the 2-methylethylamino-4,5-dihydrothieno[3,2-e]benzothiazole.

EXAMPLE 13

Preparation of 2-methylisopropylamino-4,5-dihydrothieno [3,2-e]benzothiazole

In place of the N,N-dimethylthiourea of Example 10, there is employed an equimolecular quantity of N-methyl-N-isopropylthiourea whereby the 2-methylisopropylamino-4,5 - dihydrothieno[3,2-e]benzothiazole is obtained in equally good yield.

EXAMPLE 14

Preparation of 2-aminothieno[3,2-e]benzothiazole

Solutions of 2.09 g. of 2-amino - 4,5 - dihydrothieno [3,2-e]benzothiazole and 1.93 g. of 5,6-dichloro-2,3-dicyanobenzoquinone, each in the minimum volume of dioxane, are combined. The resulting solution is stirred at room temperature for 64 hours and filtered. After partial decolorization with charcoal, the filtrate is concentrated whereupon the residue crystallizes. After recrystallization from ethanol, there is obtained 1.45 g. of product, M.P. 237.5°–241.0° C.

We claim:

1. A compound selected from the group consisting of those of the formula:

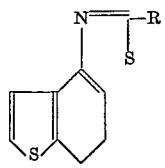

wherein R is selected from the group consisting of amino, hydrazino, mono(lower alkyl)amino, mono(lower alkenyl)amino and di(lower alkyl)amino; and the non-toxic pharmaceutically acceptable acid-addition salts thereof.

2. A compound according to claim 1 wherein R is amino.

3. A compound according to claim 1 wherein R is hydrazino.

4. A compound according to claim 1 wherein R is methylamino.

5. A compound according to claim 1 wherein R is isopropylamino.

6. A compound according to claim 1 wherein R is allylamino.

7. A compound according to claim 1 wherein R is 3-butenylamino.

8. A compound according to claim 1 wherein R is dimethylamino.

9. A compound according to claim 1 wherein R is methylisopropylamino.

10. A compound selected from the group consisting of 2 - aminothieno[3,2-e]benzothiazole represented by the formula:

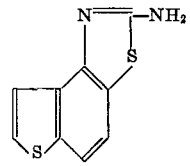

and the non-toxic pharmaceutically acceptable acid-addition salts thereof.

References Cited

UNITED STATES PATENTS 2,891,862    6/1959    Van Allan _____ 260—305

ALEX MAZELL, Primary Examiner

R. J. GALLAGHER, Assistant Examiner

U.S. Cl. X.R.

260—332.3 P; 474—200, 270

UNITED STATES PATENT OFFICE
CERTIFICATE OF CORRECTION

Patent No. 3,631,173    Dated December 28, 1971

Inventor(s) William Alan Remers and Martin Joseph Weiss

It is certified that error appears in the above-identified patent and that said Letters Patent are hereby corrected as shown below:

Column 2, line 61 "1" should be -- [ --.

Column 3, lines 5 and 6 "pawl" should be -- paw --.
Column 3, line 7 "challenege" should be -- challenged --.
Column 3, line 9 "Expt." should be -- Exptl. --.
Column 3, line 20 "[3,1-e]" should be --[3,2-e] --.
Column 3, line 68 "recrystalliaztions" should be -- recrystallizations --.
Column 3, line 75 "4,19" should be -- 4.19 --.

Column 5 lines 50-56, the formula should be as follows and not as in the patent.

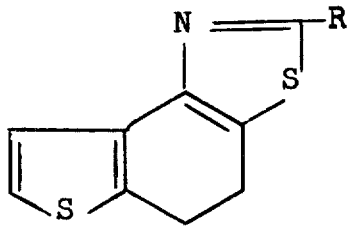

Signed and sealed this 6th day of June 1972.

(SEAL)
Attest:

EDWARD M. FLETCHER, JR.
Attesting Officer

ROBERT GOTTSCHALK
Commissioner of Patents